Oct. 15, 1929.   H. R. BARING-GOULD   1,731,974
GUARD
Filed July 16, 1927
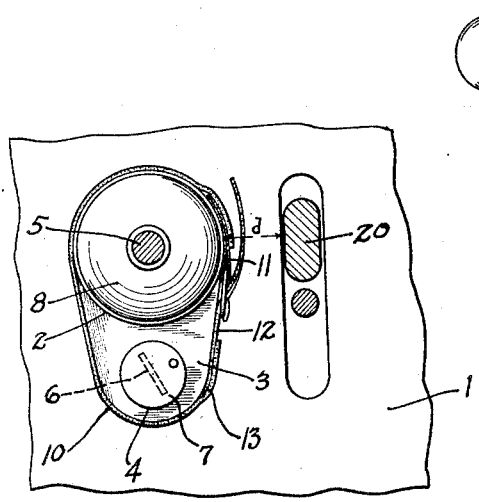
FIG.2
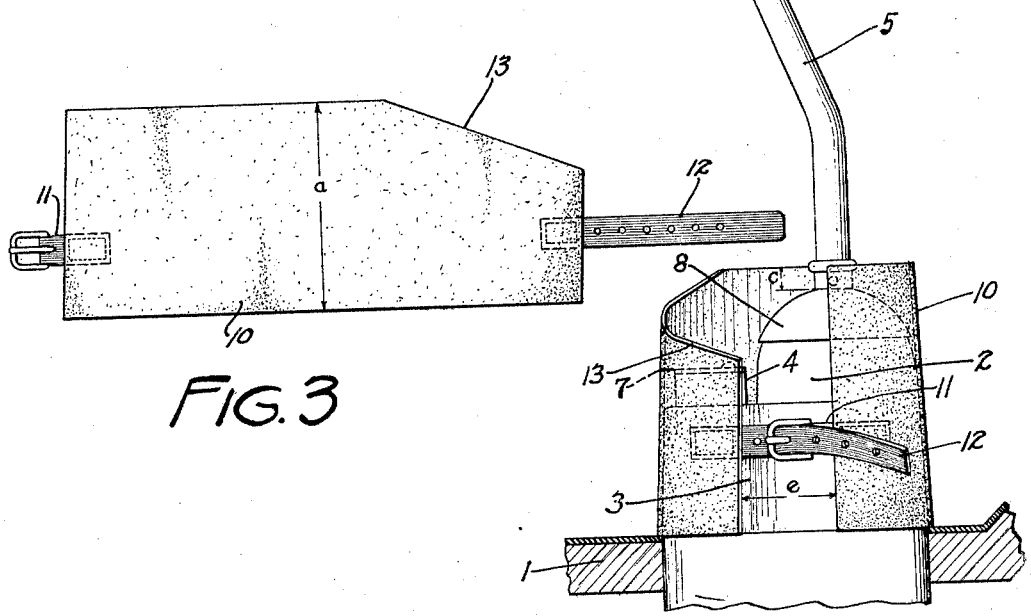
FIG.3
FIG.1
Inventor
HARRIET R. BARING-GOULD
By Paul, Paul + Moore
ATTORNEYS Patented Oct. 15, 1929

1,731,974

UNITED STATES PATENT OFFICE

HARRIET R. BARING-GOULD, OF MINNEAPOLIS, MINNESOTA

GUARD

Application filed July 16, 1927. Serial No. 206,232.

This invention relates to improvements in guards, and provides a device which is applicable to the base of a shift lever of an automobile, or to the shift lever projection of the gear box. An important object of the invention is to provide such a device which will prevent scarring of the shoes, and deposit of grease on shoes or clothing. Other objects are to provide a device which may be conveniently applied; which is open at the top to permit free operation of the lever as well as to permit removal of the grease or dirt from the lever base or projection; to provide a device which may be flattened out and which is thus adapted to be packed in small space for shipping; to provide a device of a size to substantially circumscribe any size or form of shift lever base, and which is of flexible material so that it will freely conform to the configuration of such a projection; and to provide means for causing the device to embrace the projection and to be held in proper position without creeping either in circumferential or vertical directions.

Features of the invention include the general idea of providing an open top device of this character, as well as to all the details of construction, including a construction allowing for introduction of a key into a transmission lock over the top of the guard, and permitting access to the projection for cleaning.

Some of the advantages of the invention are cheapness, ease of attachment, and use on projections of varying size and configuration.

Other advantages will be set forth in the description of the drawings forming a part of this application and in said drawings:

Figure 1 is a vertical section through the floor of an automobile showing my device applied to the shift lever projection of the gear casing, the device being viewed from the buckle side;

Figure 2 is a top plan view, the shift lever being in section, and the relation of the brake lever also being shown; and Figure 3 is an inner face view of the device flattened out.

The numeral 1 indicates the floor of an automobile and the numeral 2 the upwardly projecting portion of the gear box, within and upon which the shift lever 5 is mounted. The lever 5 has at its upper end the usual removable knob 6 and the extension 2 has a lateral enlargement 3 which contains the transmission lock, not shown. The barrel of the lock is shown at 4, and the keyhole is indicated at 6. A pivoted plate 7 prevents entrance of dust into the keyhole. The upper end of the projection 2 is spherical. A cap 8 secured to and movable with the handle 5 covers the opening (not shown) in the projection, through which the lever 5 extends. It is to be understood that not only in this form of shift lever construction but in other forms grease escapes at the top of the projection 2, and runs downwardly on the outside, where the shoes or clothing may come in contact with it. It is, therefore, an object of this invention to prevent contact of the clothing or shoes with the projection. This device, in the nature of a guard, also protects the shoes against marring or scuffing by engagement with the projections 2 or 3.

The guard herein comprises a length of flexible material 10 of such nature as will not absorb liquids, particularly grease. Various materials may be used, provided they are flexible and provided they are substantially moisture-proof for the purpose set forth. The vertical height $a$ of the guard is greater than the over-all height of the projection 2 plus the element 8, by some distance indicated by $c$ in Figure 1. This height, however, is not great enough to interfere with the cleaning of the outer side of the projection 2 and element 8 while the guard is in position. Therefore, access can be had for wiping off the grease or dust. It is advisable to have the circumferential length of the guard substantially equal to the perimeter of the projection which it encircles and embraces. However, as herein shown, this is not true and a space $e$ is provided between the ends of the guard element, see Figure 1. This provides a certain range, permitting the device to be used on projections having different circumferential lengths. The strip-like form, flexibility, thinness of the material allow for a snug fit, and facilitate placement about the shift lever projection, even when the brake lever 20, see Figure 2, is spaced only a very short distance $d$ from the projection 2. Thus even where the space between the projection 2 and the brake lever 20 is very small the device is just as conveniently and easily applied.

In order to provide the proper tension for frictionally engaging the device with the projection, strap sections 11—12 have been provided, respectively attached to opposite ends as shown. When applied, the buckle of the strap occupies a position substantially as shown in Figures 1 and 2, or in other words, at that side adjacent the brake lever and, therefore, at that side opposite the side against which the foot engages the projection 2 or the guard 10.

Another feature of the invention is the means provided to permit easy introduction of the key. For this purpose, the element 10 is cut diagonally as shown at 13, and when the device is in protecting position, this portion is related substantially as shown in Figure 1 so that the guard will not interfere with the introduction of the key. It will be noted that this cut-down portion lies at the right so that a person who is seated at driving position, and who is using the right hand, may conveniently introduce the key by a movement to the left, over the edge of the cut-down portion of the guard.

The use of a flexible strip permits the device to properly encircle a projection of any shape. The straps provide means whereby the device can be put under that tension necessary to properly frictionally engage the guard with the projection to prevent upward travel, loosening, circular motion or creeping. The straps, therefore, provide means for obtaining the constricting action and pressure to frictionally secure the device about the projection. The flexible nature of the material permits the device to naturally conform to the configuration of the lever base whatever its shape. Another advantage is that the device can be flattened out to occupy small space for shipping.

The present device is of a nature which can be made to encircle and conform to a housing projection of any shape, or size, inasmuch as it is not positively necessary that the ends of the strip be brought together but only that protection against grease and scuffing be provided at that side of the lever of the casing projection against which the foot engages, generally the left side.

I claim as my invention:

1. In combination with an automobile, including a floor and the shift lever and lock projections of the gear box, a guard element encircling and extending above said projection and open at the top sufficiently to permit free access to the top of said projection when the element embraces it, a portion of the guard adjacent the lock projection being reduced in height.

2. In combination with a shift lever projection of a gear box, a guard element encircling said projection and open at the top, said element having straps acting to constrict and cause the element to frictionally embrace the projection, said straps lying at a level adjacent the base of the projections.

In witness whereof, I have hereunto set my hand this 14th day of July, 1927.

HARRIET R. BARING-GOULD.